United States Patent
DiBenedetto et al.

(10) Patent No.: US 9,790,855 B2
(45) Date of Patent: Oct. 17, 2017

(54) APPARATUS AND METHOD FOR PROVIDING DAMPER LIQUID IN A GAS TURBINE ENGINE

(71) Applicant: United Technologies Corporation, Hartford, CT (US)

(72) Inventors: Enzo DiBenedetto, Kensington, CT (US); James B. Coffin, Windsor, CT (US); Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 609 days.

(21) Appl. No.: 13/955,385

(22) Filed: Jul. 31, 2013

(65) Prior Publication Data

US 2013/0305733 A1    Nov. 21, 2013

Related U.S. Application Data

(63) Continuation of application No. 12/470,875, filed on May 22, 2009, now Pat. No. 8,511,055.

(51) Int. Cl.
*F02C 7/06* (2006.01)
*F01D 25/20* (2006.01)
*F01D 25/16* (2006.01)

(52) U.S. Cl.
CPC .............. *F02C 7/06* (2013.01); *F01D 25/164* (2013.01); *F01D 25/20* (2013.01); *F05D 2260/96* (2013.01)

(58) Field of Classification Search
CPC .......... F01D 25/164; F01D 25/20; F02C 7/06; F05D 2260/96
See application file for complete search history.

(56) References Cited

U.S. PATENT DOCUMENTS

| | | |
|---|---|---|
| 1,871,055 A | 8/1932 | Hasbrouck |
| 2,239,098 A | 4/1941 | Hunter |
| 2,324,464 A | 7/1943 | Parker |
| 2,380,668 A | 7/1945 | Morrison |
| 2,494,209 A | 1/1950 | Sikorsky |

(Continued)

FOREIGN PATENT DOCUMENTS

| | | |
|---|---|---|
| EP | 1213445 A1 | 6/2002 |
| EP | 1876338 A2 | 1/2008 |

(Continued)

OTHER PUBLICATIONS

Extra-Flugzeugbau GmbH, Service Manual Extra 300, Chapter 79—Oil System, page date: Jan. 31, 1995, pp. 1-12.

(Continued)

*Primary Examiner* — Carlos A Rivera
(74) *Attorney, Agent, or Firm* — Kinney & Lange, P.A.

(57) ABSTRACT

A method for distributing liquid in a gas turbine engine is disclosed. The method includes rotating a fan shaft coupled to a spool via a fan drive gear system. The spool drives rotation of the fan shaft through the fan drive gear system during operation of the gas turbine engine. A pump is driven via the fan shaft. Liquid is supplied from a sump to the pump under a first operating condition. Liquid is supplied from an auxiliary reservoir to the pump under a second operating condition. Liquid is pumped to a damper.

19 Claims, 2 Drawing Sheets

(56) References Cited

U.S. PATENT DOCUMENTS

| | | |
|---|---|---|
| 2,826,255 A | 3/1958 | Peterson |
| 2,830,668 A | 4/1958 | Gaubis et al. |
| 2,831,490 A | 4/1958 | Simcock |
| 2,871,981 A * | 2/1959 | Baits ................. F16N 29/02 |
| | | 137/565.33 |
| 2,984,975 A | 5/1961 | Rodgers et al. |
| 3,025,672 A | 3/1962 | Syrovy |
| 3,834,157 A | 9/1974 | Hoffmann |
| 3,910,651 A * | 10/1975 | Pearce ................. F01D 25/164 |
| | | 384/99 |
| 4,062,185 A | 12/1977 | Snow |
| 4,117,907 A | 10/1978 | Lechler |
| 4,153,141 A | 5/1979 | Methlie |
| 4,252,140 A | 2/1981 | Hildebrandt |
| 4,309,870 A | 1/1982 | Guest et al. |
| 4,367,638 A | 1/1983 | Gray |
| 4,531,358 A * | 7/1985 | Smith ................. F01D 25/20 |
| | | 184/6.11 |
| 4,669,893 A | 6/1987 | Chalaire et al. |
| 4,782,658 A | 11/1988 | Perry |
| 4,813,445 A | 3/1989 | Lu |
| 4,947,639 A | 8/1990 | Hibner et al. |
| 4,974,410 A | 12/1990 | Wright et al. |
| 4,983,051 A | 1/1991 | Hibner et al. |
| 5,110,257 A | 5/1992 | Hibner et al. |
| 5,344,239 A | 9/1994 | Stallone et al. |
| 5,433,674 A | 7/1995 | Sheridan et al. |
| 5,472,383 A | 12/1995 | McKibbin |
| 5,590,736 A | 1/1997 | Morris et al. |
| 5,603,574 A | 2/1997 | Ide et al. |
| 5,911,678 A | 6/1999 | White |
| 6,223,616 B1 | 5/2001 | Sheridan |
| 6,267,147 B1 | 7/2001 | Rago |
| 6,325,546 B1 * | 12/2001 | Storace ................. F01D 21/04 |
| | | 384/536 |
| 6,793,042 B2 | 9/2004 | Brouillet |
| 6,846,158 B2 * | 1/2005 | Hull ................. F01D 25/164 |
| | | 384/99 |
| 7,118,336 B2 | 10/2006 | Waddleton |
| 7,662,059 B2 * | 2/2010 | McCune ................. F01D 25/20 |
| | | 184/27.2 |
| 7,849,668 B2 * | 12/2010 | Sheridan ................. F01D 15/10 |
| | | 184/6.11 |
| 8,201,389 B2 | 6/2012 | Eleftheriou et al. |
| 2006/0260323 A1 * | 11/2006 | Moulebhar ........... F01D 21/003 |
| | | 60/793 |
| 2007/0157596 A1 | 7/2007 | Moniz |
| 2008/0063333 A1 | 3/2008 | Bruno et al. |
| 2008/0096714 A1 * | 4/2008 | McCune ................. F01D 25/20 |
| | | 475/159 |
| 2008/0098712 A1 * | 5/2008 | Sheridan ................. F01D 15/10 |
| | | 60/226.1 |
| 2008/0116009 A1 | 5/2008 | Sheridan et al. |
| 2009/0081039 A1 * | 3/2009 | McCune ................. F02C 7/04 |
| | | 415/214.1 |
| 2009/0090096 A1 * | 4/2009 | Sheridan ................. F02C 7/36 |
| | | 60/226.3 |
| 2009/0293445 A1 * | 12/2009 | Ress, Jr. ................. F02C 3/067 |
| | | 60/39.15 |

FOREIGN PATENT DOCUMENTS

| | | |
|---|---|---|
| EP | 1918527 A2 | 5/2008 |
| EP | 1918564 A2 | 5/2008 |

OTHER PUBLICATIONS

Extended European Search Report for Application No. 10163716.3, dated Apr. 23, 2014, 6 pages.

\* cited by examiner

US 9,790,855 B2

APPARATUS AND METHOD FOR PROVIDING DAMPER LIQUID IN A GAS TURBINE ENGINE

CROSS-REFERENCE TO RELATED APPLICATION

This application is a continuation of U.S. patent application Ser. No. 12/470875 (filed 22 May 2009).

BACKGROUND

The present invention relates to a system for distributing liquid, and in particular, to a system for distributing liquid to a damper in a gas turbine engine.

Gas turbine engines typically have shafts for fans and spools that rotate at high speed during operation. Small imbalances associated with the rotating shafts can cause these shafts to vibrate in a radial direction with respect to a centerline axis of the shaft. Such vibrating motion is commonly referred to as synchronous vibration or whirl of the shaft. Amplitude of the vibration can become relatively large as the frequency approaches or passes through a resonant frequency of the overall system. These shafts are typically supported by bearings, which tend to be relatively stiff and transmit vibration to the engine. In order to reduce engine damage as a result of this vibration, one or more of the bearings are often supported by a damper such as a thin fluid film vibration damper. These dampers damp the vibration amplitude and can also shift the resonant frequency of the system.

Thin fluid film vibration dampers use a thin film of liquid positioned between two closely spaced surfaces to achieve the damping effect. Typical gas turbine engines supply this liquid with a main lubricating liquid pump. The main lubricating liquid pump is usually driven off the high pressure spool and positioned toward the aft of the engine. In order to supply liquid to a damper near the front of the engine, a relatively large amount of external piping is used to span the distance. That piping can take up space and add undesired weight to the engine.

SUMMARY

A method for distributing liquid in a gas turbine engine includes rotating a fan shaft coupled to a spool via a fan drive gear system, such that the spool drives rotation of the fan shaft through the fan drive gear system during operation of the gas turbine engine. A pump is driven via the fan shaft. Liquid is supplied from a sump to the pump under a first operating condition, and from an auxiliary reservoir under a second operating condition. Liquid is pumped from the pump to a damper.

DETAILED DESCRIPTION

Figure 1:
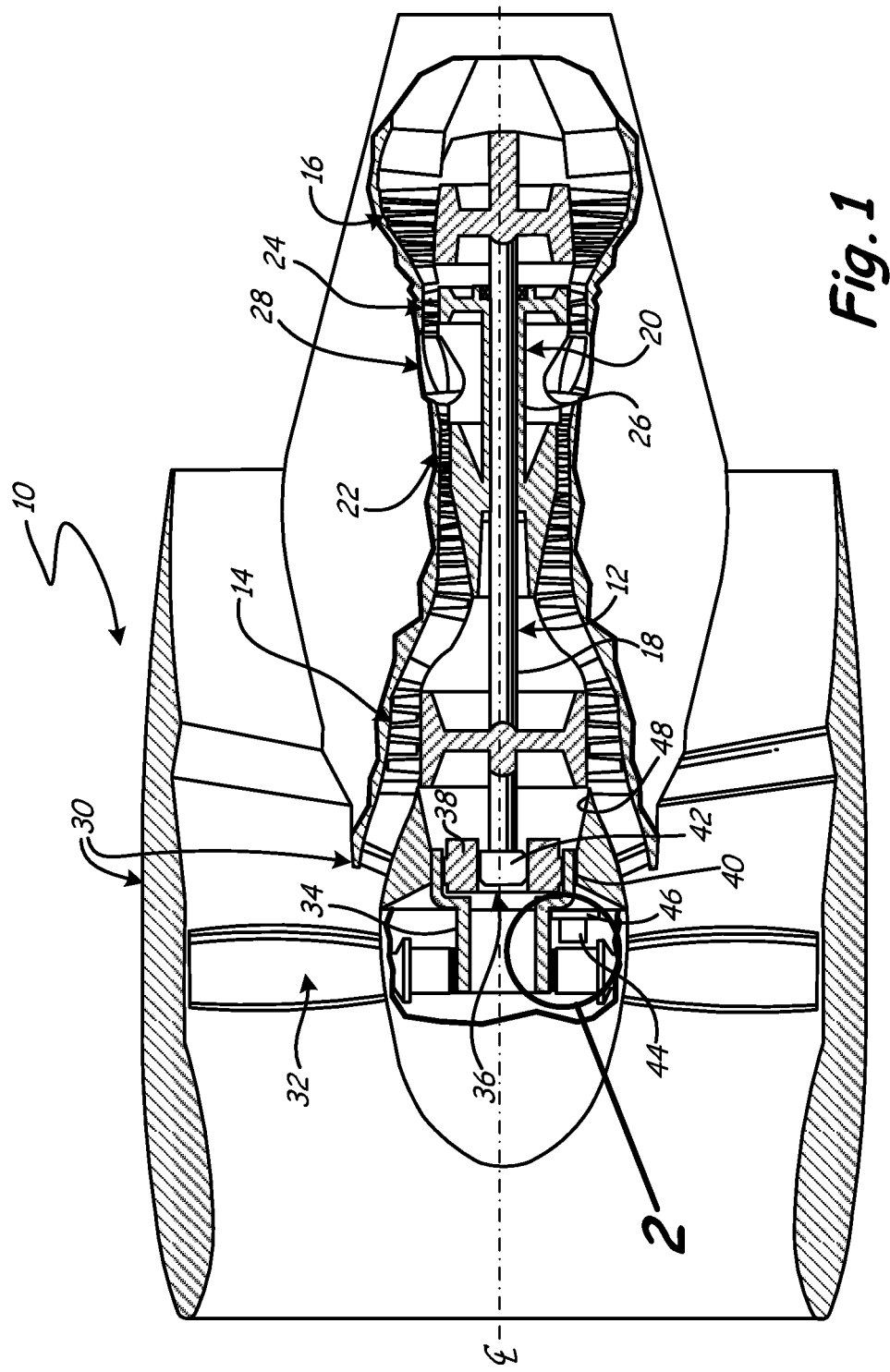
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves around sun gear 42, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both of fan 32 and low pressure spool 12.

Pump 44 is coupled to and is driven by fan shaft 34 via pump gear 46 such that pump 44 can operate whenever fan shaft 34 is rotating. Pump 44 supplies liquid, such as oil, to lubricate gears and bearings of fan drive gear system 36. Fan drive gear system 36 benefits from a relatively continuous supply of lubricating liquid whenever fan shaft 34 is rotating. At least some of the liquid supplied to fan drive gear system 36 drains to sump 48 and is eventually pumped back through pump 44.

Figure 2:
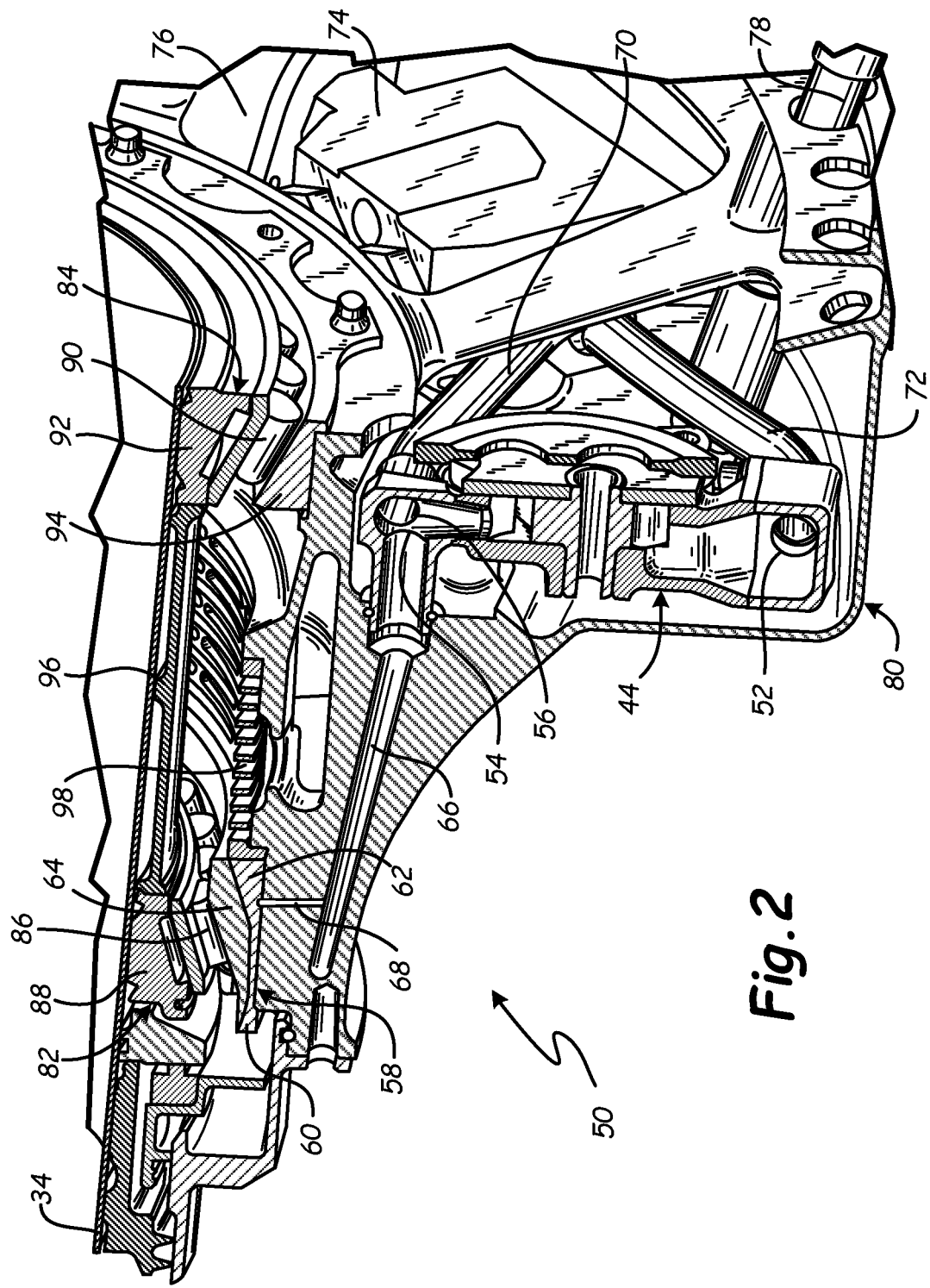
FIG. 2 is a schematic sectional view, taken from FIG. 1, of a liquid distribution system for use in the gas turbine engine of FIG. 1.

FIG. 2 is a schematic sectional view, taken from FIG. 1, of liquid distribution system 50. Liquid distribution system 50 includes pump 44 (which includes pump inlet 52, first pump outlet 54, and second pump outlet 56), squeeze film vibration damper 58 (which includes squeeze film chamber 60 spaced between damper outer sleeve 62 and damper inner sleeve 64), and wide and narrow damper supply passages 66 and 68 fluidically connecting first pump outlet 54 to squeeze film vibration damper 58. Pump 44 supplies high pressure liquid, such as oil, through wide damper supply passage 66, through narrow damper supply passage 68, and into squeeze film chamber 60. Pressure of liquid in squeeze film chamber 60 can be selected to provide a suitable amount of damping for a particular application.

Liquid distribution system 50 further includes gear bearing supply passage 70 fluidically connecting second pump outlet 56 to fan drive gear system 36 (shown in FIG. 1) and pump inlet passage 72 fluidically connecting valve 74 to pump inlet 52. Valve 74 is fluidically connected to and adjacent to auxiliary reservoir 76 as well as fluidically connected to sump 48 via sump scavenge passage 78. Pump 44 supplies lubricating liquid to journal bearings (not shown) for gears of fan drive gear system 36 (shown in FIG. 1) through gear bearing supply passage 70. A different valve (not shown) can be placed along gear bearing supply passage 70 to selectively restrict liquid from pump 44 from reaching fan drive gear system 36. For example, liquid from pump 44 can be redirected to sump 48 except when a main pump system (not shown) fails to supply adequate liquid to fan drive gear system 38. In that sense, pump 44 can be a backup or auxiliary lubrication pump.

Valve 74, on the other hand, selectively restricts whether liquid from sump 48 or auxiliary reservoir 76 is supplied to pump inlet 52. Valve 74 can select between these liquid sources based upon an engine operating condition. For example, auxiliary reservoir 76 is an enclosed container that is kept substantially full of liquid during positive gravity conditions so that it can be ready to supply a relatively continuous supply of liquid during zero and negative gravity conditions. Auxiliary reservoir 76 does not, however, hold enough liquid to provide a continuous supply for long periods of time unless auxiliary reservoir 76 is continuously replenished by the main pump system (not shown). Sump 48, on the other hand, can provide liquid for long periods of time even without replenishment from the main pump system (not shown). However, sump 48 is an open container that will not hold liquid in one place during zero and negative gravity conditions. In one embodiment, valve 74 can supply liquid from sump 48 to pump 44 during positive gravity conditions and supply liquid from auxiliary reservoir 76 to pump 44 during zero and negative gravity conditions. Valve 74 can include a weight (not shown) for actuating between the two input sources. In another embodiment, valve 74 can supply liquid from auxiliary reservoir 76 when gas turbine engine 10 is running at operating speed and supply liquid from sump 48 when gas turbine engine 10 is running below operating speed. Valve 74 can include a pressure sensor (not shown) for actuating between the two input sources.

Bearing compartment 80 can be a support structure for supporting fan shaft 34. No. 1 bearing 82 and No. 1.5 bearing 84 are positioned between bearing compartment 80 and fan shaft 34. No. 1 bearing 82 includes rollers 86 positioned between inner race 88 and damper inner sleeve 64. Damper inner sleeve 64 functions as both an inner sleeve for damper 58 and an outer race for No. 1 bearing 82. Thus, fan shaft 34 is supported by No. 1 bearing 82 which is supported by damper 58 which is supported by bearing compartment 80. No. 1.5 bearing 84 includes rollers 90 positioned between inner race 92 and outer race 94. In the illustrated embodiment, outer race 94 is positioned directly adjacent a portion of bearing compartment 80. In another embodiment, No. 1.5 bearing 84 can be supported by a squeeze film vibration damper in a manner similar to that of No. 1 bearing 82. Inner race 88 is spaced from inner race 92 by spacer 96. Spring 98 is compressed between damper 58 and a flange of bearing compartment 80 in an axial direction with respect to fan shaft 34. Spring 98 keeps pre-load on No. 1 bearing 82 under substantially all operating conditions.

As fan shaft 34 rotates, it can vibrate and impart relatively strong forces radially outward from centerline $C_L$ to No. 1 bearing 82. These forces are transmitted to damper inner sleeve 64, which is pressed out toward damper outer sleeve 62, squeezing the film of liquid between. Since damper inner and outer sleeves 62 and 64 are annular, compressing damper inner and outer sleeves 62 and 64 together at one location creates more space between damper inner and outer sleeves 62 and 64 at another location for the liquid to flow to. Because the liquid is under high pressure and relatively viscous, vibration is dampened as the liquid is squeezed from one location in damper 58 to another.

Vibration can press inner sleeve 64 toward outer sleeve 62 with such force that a pressure wave is created in the liquid. The pressure wave can be strong enough to damage pump 44 if allowed to transmit back to pump 44. In the illustrated embodiment, narrow damper supply passage 68 is narrow enough to restrict pressure wave travel through narrow damper supply passage 68. Wide damper supply passage 66 is wider than narrow damper supply passage 68 to provide ample fluid to narrow damper supply passage 68 and to allow narrow damper supply passage 68 to be the limiting structure.

Because pump 44 is positioned relatively close to damper 58, wide and narrow damper supply passages 66 and 68 can be relatively short. Positioning pump 44, damper 58, and No. 1 bearing 82 all inside bearing compartment 80 helps make such short distances possible. In one embodiment, wide and narrow damper supply passages 66 and 68 can have a combined length of less than about 2 feet (about 0.6096 meters). In another embodiment, wide and narrow damper supply passages 66 and 68 can have a combined length of less than about 1 foot (about 0.3048 meters) so long as pump 44 is sufficiently close to damper 58.

Overall weight of gas turbine engine 10 can be further reduced by extending a portion of one of wide and narrow damper supply passages 66 and 68 through a support structure, such as bearing compartment 80, as opposed to running external piping. In the illustrated embodiment, substantially all of wide and narrow damper supply passages 66 and 68 extend through bearing compartment 80. This not only reduces weight, but also takes up less space in gas turbine engine 10.

It will be recognized that the present invention provides numerous benefits and advantages. For example, damper 58 dampens fan shaft vibration, thus reducing vibration induced damage to gas turbine engine 10. Because pump 44 is the auxiliary pump driven off fan shaft 34, liquid distribution system 50 can supply liquid to damper 58 during certain extraordinary engine operating conditions, such as zero and negative gravity conditions. Because pump 44 is positioned relatively close to damper 58, wide and narrow damper supply passages 66 and 68 can be relatively short, reducing overall weight and space taken by liquid distribution 50. Overall weight and space taken by liquid distribution 50 are further reduced by plumbing wide and narrow damper supply passages 66 and 68 through bearing compartment 80 as opposed to adding external pipes.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, pump 44 need not be an auxiliary lubrication pump so long as pump 44 is driven by fan shaft 32 and supplies liquid to bearing 58.

The invention claimed is:

1. A method for distributing liquid in a gas turbine engine, the method comprising:
   rotating a fan shaft coupled to a spool via a fan drive gear system such that the spool drives rotation of the fan shaft through the fan drive gear system during operation of the gas turbine engine;
   driving a pump via the fan shaft connected to the pump through the fan drive gear system;
   supplying a first portion of a liquid from a sump to the pump under a first operating condition;
   supplying a second portion of the liquid from an auxiliary reservoir to the pump under a second operating condition;
   pumping one of the first and second portions of the liquid from the pump to a damper;
   supporting bearings with the damper: and
   supporting the fan shaft with the bearings.

2. The method of claim 1, and further comprising:
damping fan shaft vibration with the damper.

3. The method of claim 1, and further comprising:
rotating the spool slower than engine operating speed while pumping liquid from the pump to the damper.

4. The method of claim 1, wherein:
the first operating condition is a positive gravity condition; and
the second operating condition is chosen from the group consisting of a zero gravity condition and a negative gravity condition.

5. The method of claim 1, and further comprising:
pumping liquid from the pump to the fan drive gear system.

6. The method of claim 1, wherein the liquid is a lubricating oil, the spool is a low pressure spool, and the damper is a squeeze film vibration damper.

7. A fluid distribution system for use in a gas turbine engine, the fluid distribution system comprising:
a fan connected to a fan shaft;
a bearing configured to support the fan shaft;
a damper supporting the bearing;
a sump fluidically connected to the damper;
an auxiliary reservoir fluidically connected to the damper; and
a pump connected to and driven by the fan shaft through gearing and fluidically connected to the damper, the sump, and the auxiliary reservoir, wherein the pump is configured to supply a first portion of a liquid from the sump to the damper during a first operating condition, and wherein the pump is configured to supply a second portion of the liquid from the auxiliary reservoir to the damper during a second operating condition.

8. The fluid distribution system of claim 7, wherein the damper comprises:
an inner annular sleeve opposite an outer annular sleeve for flowing the liquid between the inner and outer annular sleeves.

9. The fluid distribution system of claim 7, wherein the bearing is a No. 1 bearing of the gas turbine engine.

10. The fluid distribution system of claim 7, and further comprising:
a bearing compartment supporting the fan shaft and containing the pump, the damper, and the bearing.

11. The fluid distribution system of claim 7, wherein:
the first operating condition is a positive-gravity condition; and
the second operating condition is chosen from the group consisting of a zero-gravity condition and a negative-gravity condition.

12. The fluid distribution system of claim 7, and further comprising a damper supply passage fluidically connecting the pump to the damper.

13. The fluid distribution system of claim 12, wherein a portion of the damper supply passage extends through a fan shaft support structure.

14. The fluid distribution system of claim 7, wherein the damper is a squeeze film vibration damper for damping fan shaft vibration.

15. A fluid distribution system for use in a gas turbine engine, the fluid distribution system comprising:
a fan connected to a fan shaft;
a bearing configured to support the fan shaft;
a damper supporting the bearing;
a sump capable of containing a first portion of a liquid;
an auxiliary reservoir capable of containing a second portion of the liquid;
a pump connected to and driven by the fan shaft, wherein an outlet of the pump is fluidically connected to the damper;
a valve fluidically connected to the sump, the auxiliary reservoir, and the pump, wherein the valve has a first position that fluidically connects the sump to the pump and a second position that fluidically connects the auxiliary reservoir to the pump.

16. The fluid distribution system of claim 15, wherein the valve is configured to actuate to the first position during a positive-gravity condition and configured to actuate to the second position during a negative-gravity condition and a zero-gravity condition.

17. The fluid distribution system of claim 15, and further comprising:
a bearing compartment supporting the fan shaft and containing the pump, the damper, and the bearing.

18. The fluid distribution system of claim 15, and further comprising:
a damper supply passage fluidically connecting the pump to the damper, wherein a portion of the damper supply passage extends through a fan shaft support structure.

19. The fluid distribution system of claim 15, and further comprising:
a fan drive gear system coupling the fan shaft to the pump, wherein the outlet of the pump is fluidically connected to the fan drive gear system.

* * * * *